United States Patent [19]

Hurst, Jr.

[11] Patent Number: 5,617,401

[45] Date of Patent: Apr. 1, 1997

[54] CALIBRATION OF LASERS THAT PRODUCE MULTIPLE POWER OUTPUT LEVELS OF EMITTED RADIATION

[75] Inventor: Jerry E. Hurst, Jr., San Jose, Calif.

[73] Assignee: International Business Machines Corporation, Armonk, N.Y.

[21] Appl. No.: 612,994

[22] Filed: Mar. 8, 1996

[51] Int. Cl.⁶ .................................................. G11B 7/00
[52] U.S. Cl. .............................. 369/116; 369/54; 369/58; 369/59
[58] Field of Search .............................. 369/116, 54, 53, 369/58, 59, 47, 48, 49, 124, 121, 122; 359/333

[56] References Cited

U.S. PATENT DOCUMENTS 5,185,733  2/1993  Finkelstein et al. ........................ 369/54
5,268,893  12/1993  Call et al. ................................. 369/54 X

*Primary Examiner*—Muhammad N. Edun
*Attorney, Agent, or Firm*—D. A. Shifrin; H. F. Somermeyer

[57] ABSTRACT

A laser calibration apparatus and method first calibrates a maximum laser power level. Then lesser laser power levels are calibrated. A separate calibration pattern is used for calibrating each of the laser power levels. The calibration patterns used for the lesser laser power levels include the calibrated maximum laser power level. Such inclusion established a fixed relationship between the maximum laser power level and all of the lesser laser power levels. The calibration is performed on an optical disk, preferably of the magneto optical type. The calibrated laser power levels are then used to record pulse-width modulated signals.

22 Claims, 3 Drawing Sheets

CALIBRATION OF LASERS THAT PRODUCE MULTIPLE POWER OUTPUT LEVELS OF EMITTED RADIATION

FIELD OF THE INVENTION

This application relates to calibrating lasers for producing a laser beam having a succession of a plurality of diverse laser beam intensities, particularly those lasers for producing a rapid succession of said plurality of diverse beam intensities.

BACKGROUND OF THE INVENTION

Lasers have enjoyed a wide range of practical applications. It is desired to provide laser operations that provide a succession of stepped diverse laser beam intensities. A laser beam having a succession of stepped diverse beam intensities may find a wide divergence of applications. For illustrating the present invention, an application of the invention to calibrating a laser for recording data on a magneto-optical disk is shown and described. In the application to magneto-optical disks, a rapid succession of diverse laser beam intensities is desired.

In recording of any kind, including recording on optical disks, it is a continuing desire to increase the areal density of the recording. One way to increase such areal density is to increase lineal recording density along tracks on an optical disk. Earlier recording techniques employed magnetic transitions for recording and indicating binary information. Sensing these transitions produce output pulses indicating the recorded binary information. To successfully record binary information, all such magnetic transitions should be in a so-called transition position, also called a cell. Such data recording is termed pulse-position modulation (PPM). PPM can take many forms such as non-return-to-zero change on one's recording (NRZI). Non data or clock transitions were then added to NRZI recording to produce the well-known phase-encoding and frequency-modulation recording. In all of these recordings binary data are indicated by data-indicating magnetic transitions using known rules. Later, rather than representing user data values, such indications indicate 1's and 0's of a recording code, such as a d,k code. Even with all of these advances in the recording art, intersymbol interference (ISI) in PPM recording tends to limit the linear recording density of optical disks.

Pulse-width modulation (PWM) is desired to enhance lineal recording density over prior PPM recording techniques. Each data cell in PWM includes a mark and a gap. Duration or width of a mark indicates a block of information, such as one d,k code block. A leading recorded transition (herein arbitrarily indicated as a positive-going transition P) indicates an onset or leading edge of a mark that is usually also an onset of a new data cell. A mark-trailing or negative-going transition N is within a data cell and indicates end or edge of a mark and onset of a gap. Herein such leading and trailing transitions are respectively and arbitrarily shown as positive and negative going transitions P and N. To obtain high linear recording densities, higher than PPM densities, such PWM data cells are extremely short. As such, PWM introduces a need for an enhanced recording system. One such enhanced PWM recording system is shown in Belser et al U.S. Pat. No. 5,400,313. In this optical disk recording/reading system, a minimal number of circular marks on the optical disk record a desired run length of coding to be recorded. A preferred coding is a known d,k code having 1,7 parameters. This recording system provides for accurately locating mark-gap transitions on the optical disk, a necessity for high-density PWM recording. To record a mark, a plurality of short laser pulses having selected recording power levels are used. Belser et al show three laser pulse power levels that may be combined for recording the range of marks allowed by a recording code. The recording pulse power levels are selected based on recording patterns for accurately obtaining sharp recording edges or transitions. Such laser pulse recording levels shape the mark on the recording layer for enabling more faithful reproduction of recorded data. Co-pending commonly-assigned application by Hurst, Jr., Ser. No. 08/342,196, filed Nov. 18, 1994, teaches a multi-power-levels for a mark in a recording system in which a novel pre-heating operation is employed for obtaining enhanced recording.

Since optical disks are usually removable and made by several vendors, optical disk recording parameters vary between disks such that a separate calibration is needed for each optical disk. Therefore, it is desirable to calibrate the laser for writing on each disk as it is received into (mounted) an optical disk drive. Usually such mounting is commanded by an attaching host processor. It is important to ensure that the attaching host processor does not wait very long before accessing a mounted optical disk. Accordingly, write calibration should be accomplished in a minimal time. In accordance with this invention, a calibration procedure is provided that enables one calibration to effect calibrations of a plurality of recording power levels.

DISCUSSION OF PRIOR ART

Romeas et al, in U.S. Pat. No. 4,631,713, show recording binary test words on a write-once optical disk having a 1-0 monotonous repeated pattern to calibrate a laser for PPM recording. The durations of the respective "1" and "0" portions of the test pattern are measured. The laser write power that results in equality of the durations of the 1 and 0 portions is selected as the recording value.

Bletscher, Jr. et al in U.S. Pat. No. 5,070,495 show an extensive calibration system for PPM recording based on symmetrical parameters in calibration patterns.

Call et al in U.S. Pat. No. 5,185,734 shows calibrating a DAC (digital to analog converter) to supply a given output analog signal for any input digital value within a range of input digital values. This calibration means that input digital values can be used to activate a calibrated DAC to produce accurate analog laser-drive signals to diverse power levels.

Call et al in U.S. Pat. No. 5,216,659 show a laser power calibration by measuring laser drive current in an out-of-focus beam condition at the surface of a WORM medium and in an in-focus condition of the laser beam at the disk surface. A slope is generated representing a variation in laser beam power level versus laser current that enables calculations of laser power based on laser current. A first step calibrates the laser in an out-of-focus condition. A second step completes the calibration in an in-focus laser beam condition.

SUMMARY OF THE INVENTION

The present invention provides for calibrating a recording system for high-linear-density pulse-width recording.

A first one of a plurality of laser pulse power levels is calibrated using a recorded calibration pattern in which the first one of the plurality of laser pulse power levels is varied in power level. Then one or more intermediate laser power levels are calibration using the calibrated first one of the laser pulse power levels at the calibrated level while varying power levels of one or more of the intermediate laser pulse power levels.

A least squares calibration procedure identifies an optimum laser pulse level for each of the plurality of laser pulse power levels. In an optical disk, a plurality of calibration sectors repeatedly receive a calibration pattern for calibrating a laser pulse power level with the laser pulse power level to be calibrated varying from sector to sector. Each laser pulse power level to be calibrated has a unique laser calibration pattern consisting of marks and gaps. Marks are recorded with varying recording powers for each laser pulse level to be calibrated while other power levels are held constant in all sectors.

Digital signal processing circuits process calibration signals read from the calibration sectors to produce calibration data that includes finding an average mark duration, average gap duration, number of marks and gaps, time clock period duration derived from the averaged mark and gap durations, desired mark and gap durations. A least squares analysis identifies optimum laser power level for each recording power level. Linear interpolation between two sectors having calibration data close to optimum values accurately identifies the optimum laser power level.

A specific embodiment calibrates three recording laser pulse power levels to be used with at least one uncalibrated laser pulse power level used in recording marks and gaps for pulse width modulated signals.

The foregoing and other objects, features and advantages of the invention will be apparent from the following more particular description of preferred embodiments of the invention, as illustrated in the accompanying drawings.

DETAILED DESCRIPTION

Figure 1:
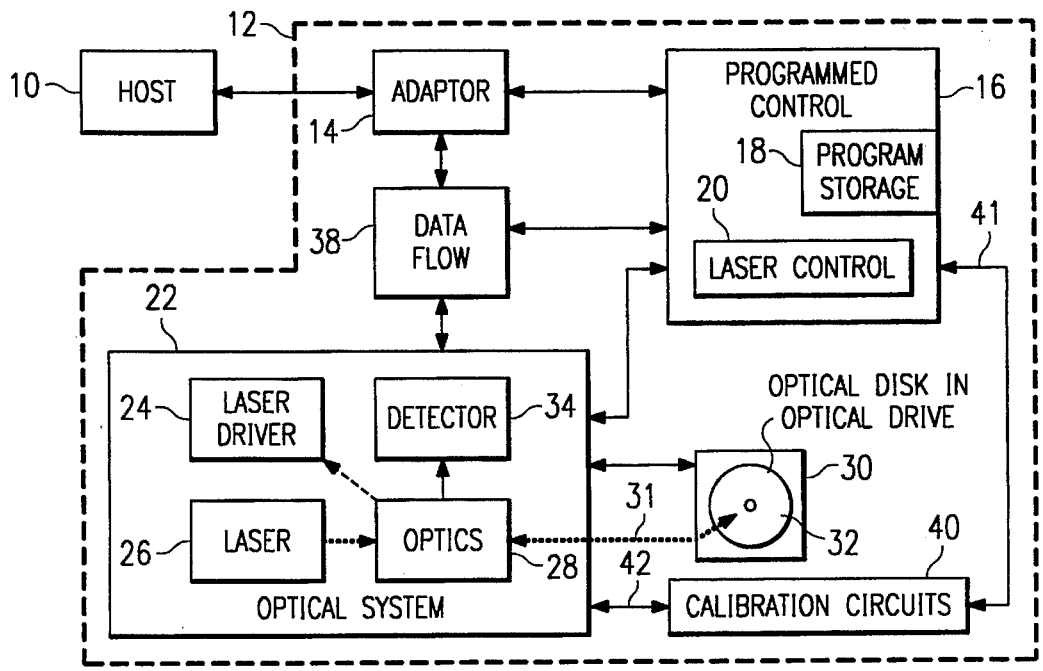
FIG. 1 illustrates in simplified block diagram form a data storage system in which the present invention is advantageously employed.
Figures 3, 4:
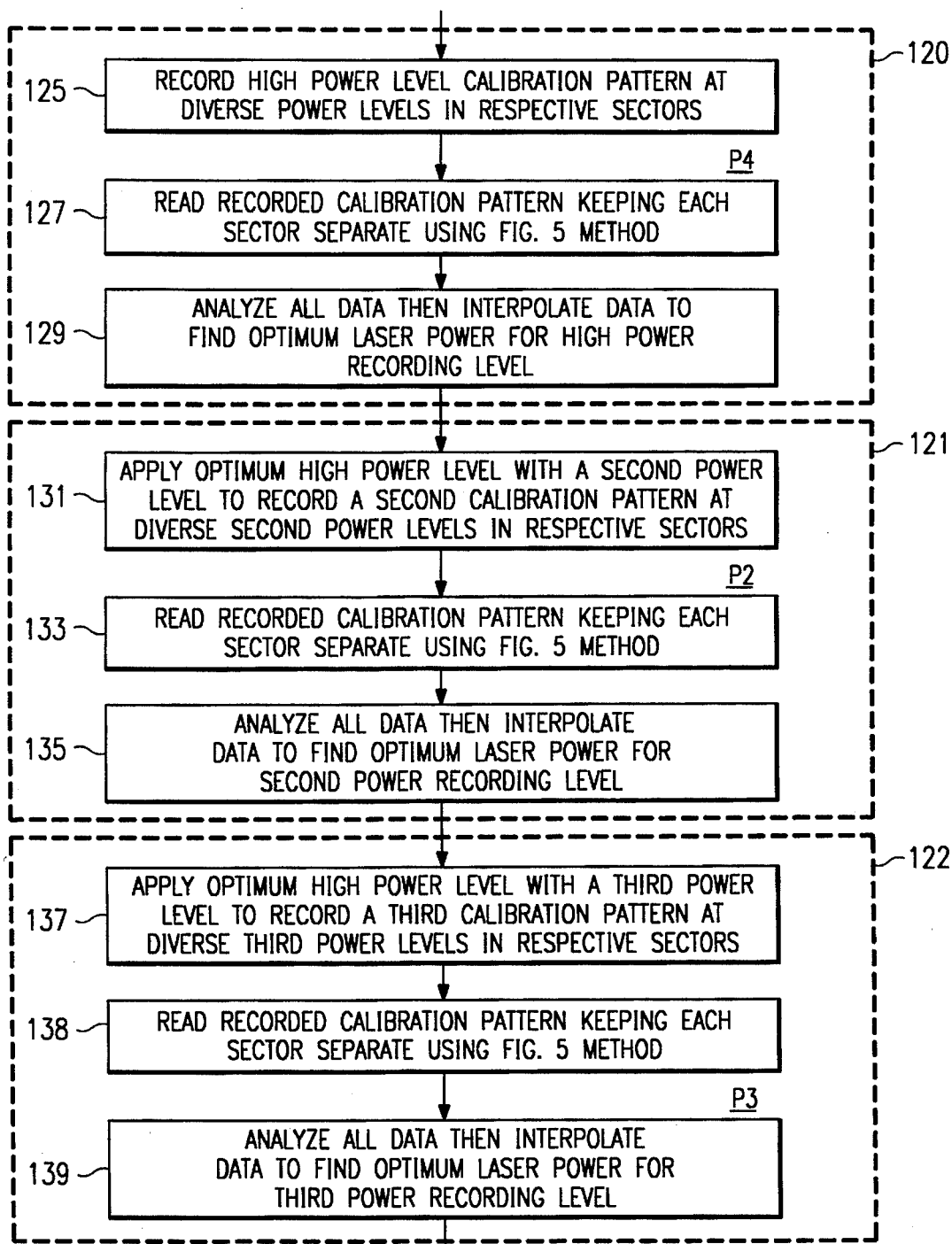
FIG. 3 diagrammatically illustrates a portion of a pulse-width-modulated signal.
FIGS. 4 and 5 are simplified flow charts showing an optical drive laser calibration of the FIG. 1 illustrated data storage system.

Referring now more particularly to the appended drawing, like numerals indicate like parts and structural features in the various figures. An optical data storage system shown in FIG. 1 incorporates an illustrative embodiment of the present invention. Host 10, a programmed computer, attaches optical disk system 12. Disk system 12 includes adaptor 14 that connects to host 10 for exchanging control and data signals therewith. Programmed control 16 that includes a programmable processor (not shown), has program storage 18 for storing program data to operate disk system 12. Laser control 20 includes those circuits that operate a laser, including those circuits for generating laser beam power signals. Optical system 22 has the usual circuits and optical elements used to control an optical disk drive 30. Laser driver 24 receives control signals from laser control 20 for operating laser 26. Laser 26 emits a beam of radiation to optics 28 that focusses and directs the beam of radiation to optical disk 32 over light path 31. Optical disk drive 30 includes a carriage (not shown) radially movable with respect to optical disk 32 for enabling scanning a spiral track (not shown) on optical disk 32. Detector 34 receives a reflected beam from optical disk 32 via optics 28, as is known. Detector 34 includes the usual data detector, servo detector and the like. Data flow 38 processes data and control signals that pass between adaptor 14 and optical system 22 for recording on and reading from optical disk 32. Calibration circuits 40 are constructed in accordance with the present invention for providing enhanced calibration for use in pulse-width-modulated (PWM) recorded signal 39 (FIG. 3). The unnumbered double-headed arrows in FIG. 1 represent usual electrical connections between the illustrated components. Double-headed arrow 41 represents later-described signal lines that carry calibration-related data and control signals between calibration circuits 40 and programmed control 16.

Figure 2:
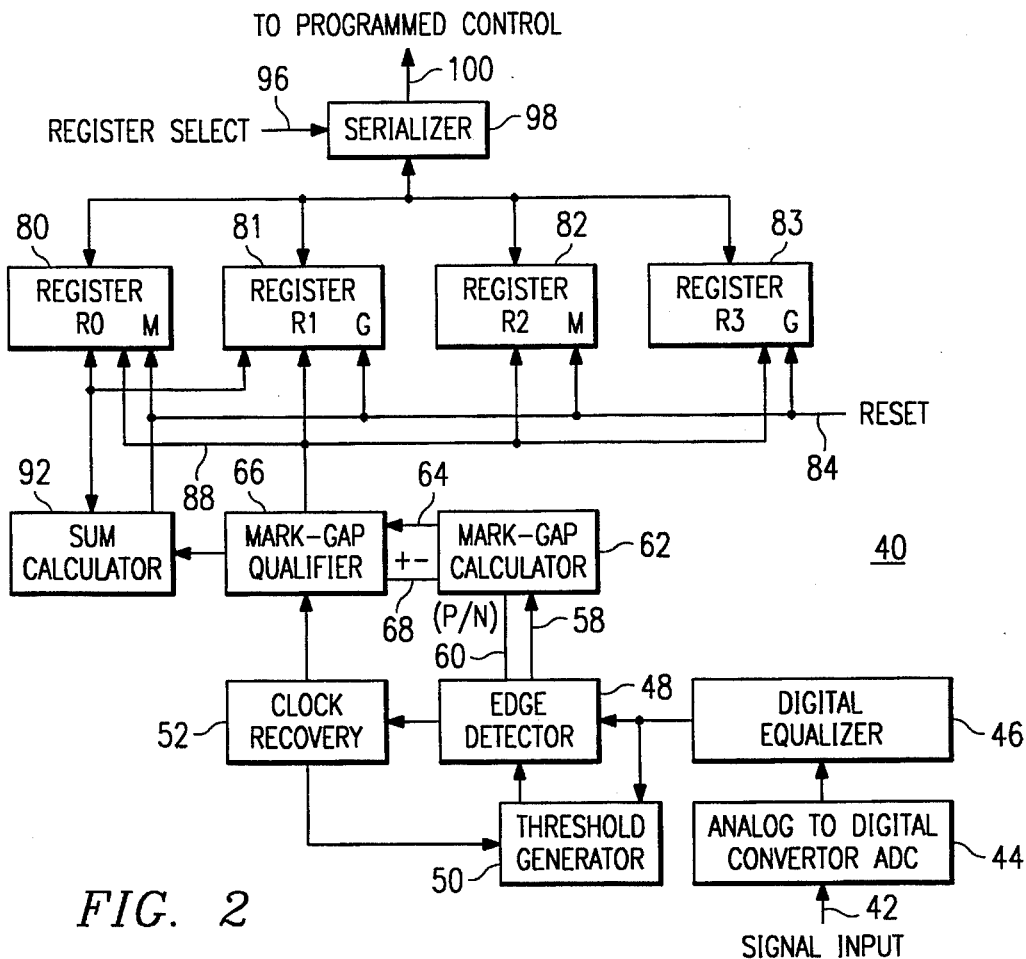
FIG. 2 is a simplified block diagram of calibration circuits used in the FIG. 1 illustrated data storage system.

This description is pointed to calibrating the FIG. 1 illustrated optical drive 30 for operating with one optical disk. If optical system 12 attaches a plurality of optical disk drives 30, then calibration circuits 40 (FIG. 2) are used in connection with any one of the optical disk drives, one at a time. Calibration circuits 40 embody the calibration methodology of this invention as later set forth with respect to FIGS. 4 and 5. Calibration circuits 40 determine durations of the marks 43 and gaps 45 (FIG. 3), sum the determined durations and the number of marks and gaps. Upon completing one calibration procedure, calibration circuits 40 supply the generated calibration data to programmed control 16 for calculating optimum laser power for the laser power level being calibrated.

The following description pertains to processing one sector of a calibration pattern, it being understood that many calibrating sectors are involved in each calibration procedure. In a first calibrating operation, calibration circuits 40, line 42 carries analog read signals from detector 34 to an analog-to-digital convertor (ADC) 44 for conversion into a sequence of multi-digit digital signals, hereafter digital signals. The sequence of digital signals represents the amplitudes of the read signals with respect to time. Digital equalizer 46 processes digital signal output of ADC 44 to supply a sequence of equalized digital signals to edge detector 48 and threshold detector 50. Clock recovery circuit 52 is connected to edge detector 48 and threshold generator 50 in a read back clock servo loop, i.e., generate a clock or timing signal based upon detecting transitions recorded on optical disk 32. Edge detector 48 supplies to mark-gap calculator 62 a sequence of detected transition-time indicating digital signals over multi-line bus 58. A transition-time indicates time of occurrence of a transition recorded on an optical disk, such as a magnetic transition in a magneto-optical disk. A sign P/N (indicates positive transition P or negative transition N) signal on line 60 indicates transition-time polarity associated with each multi-digit digital representation of the transition-time. Mark-gap calculator 62, for distinguishing between marks and gaps, calculates the difference between two successive digitally-indicated transition-times. As shown in FIG. 3, a read mark is indicated by a digitally-indicated leading positive (P) transition-time derived from a recorded mark-leading transition followed by a digitally-indicated trailing negative (N) transition-time derived from a recorded mark-trailing transition. A read gap is correspondingly indicated by a digitally-indicated trailing negative (N) transition-time derived from a recorded gap-leading transition followed by a digitally-indicated trailing positive (P) transition-time derived from a recorded gap-trailing transition. The digitally indicated transition-times are digitally amplitude qualified for rejecting noise.

It is to be remembered that a magnetic polarity transition on optical disk 32 of the calibration pattern results in an analog transition in the read signals. The digital values in the digital signals indicate analog read signal amplitude. For example, a presence of a magnetic domain recorded on disk 20 results in a maximum signal amplitude while absence of a magnetic domain is indicated by a minimum signal amplitude. This relationship of signal amplitude to the presence or absence of magnetic domains is based solely on circuit design. Amplitude qualification of the pulses is achieved by comparing the received digital signal values with a predetermined amplitude threshold value. A predetermined number of successive digital signals having values greater than the threshold value indicate the presence of a magnetic domain. The predetermined number is empirically determined to represent an amplitude that excludes noise.

Mark-gap calculator 62 orients its calculation based upon a signa for calculating duration of each mark, herein arbitrarily defined as elapsed time between a leading positive (P) transition-time and a trailing negative (N) transition-time. Similarly, gap durations are measured as elapsed time between a leading negative transition-time and a trailing positive transition-time.

Upon detecting either a mark or a gap, mark-gap calculator 62 sends a duration indicating digital signal over bus 64 to mark-gap qualifier 66. Simultaneously to the bus 64 signal, a mark (P) indicating signal on line 68 indicates a mark while a gap (N) indicating signal on line 68 indicates a gap. Marks alternate with gap indications. Mark-gap qualifier 66, timed by clock recovery circuit 52, measures durations of marks and gaps to ensure that each mark has a greater duration than a predetermined minimum duration but not exceeding a predetermined maximum duration. Gaps are duration qualified in the same manner. The minimums and maximums for marks and gaps are design choices.

Synchronously to the first operation described above, second operations of calibration circuits 40 accumulate calibration data for forwarding to programmed control 16. The accumulated calibration data are forwarded to programmed control 16 at the completion of circuits 40 calibration operations in each calibration sector.

Four register R0 80, R1 81, R2 82 and R3 83 accumulate the calibration data. The letters "M" and "G" in the registers respectively indicate that mark and gap calibration data are stored in the registers. Registers R0 80 and R1 81 respectively accumulate the total of mark and gap measured durations. Similarly, counting registers R2 82 and R3 83 respectively total the number of marks and gaps detected while reading the recorded calibration pattern. Reset line 84 (part of lines 41 in FIG. 1) carries a reset signal received from programmed control to reset registers R0–R3 to a cleared state. Accumulation of the calibration information is timed and sequenced by mark-gap qualifier 66. Upon completing qualifying any mark or gap, mark-gap qualifier 66 sends a gap/mark indicating signal over line 88 to registers R0–R3 to select registers R0 and R2 to accumulate mark information or registers R1 and R3 to accumulate gap information. Registers R2 and R3 respond respectively to the gap/mark indicating a mark or a gap to tally the number of marks and gaps that have been measured. Similarly, register R0 and R2 accumulate measured durations or widths of measured marks and gaps. A mark indicating signal on line 88 activates register R0 to an active condition and deactivates register R1. A gap indicating signal on line 88 activates register R1 to the active condition and deactivates register R0. Duration accumulation is achieved by mark-gap qualifier sending a measured duration to sum calculator 92. Sum calculator has a multi-digit adding register adder (not shown) for storing the received measured duration. Sum calculator 92 responds to receipt of the measured duration to read the active register R0 or R1 and add the contents of R0 or R1 to the just-received measured duration. The sum is then returned to the respective register R0 or R1 for accumulating all of the measured durations respectively for marks and gaps. The above-described operations are repeated until all calibration sectors have been read.

Upon programmed control 16 detecting completion of reading each sector, it sequentially reads the contents of registers R0–R3 for calculating additional later-described calibration parameter data. Programmed control 16 supplies a register select signal on line 96 to activate serializer 98 to sequential read registers R0–R3, then serializes the read accumulated calibration data for transfer over line 100 to programmed control 16. Lines 96 and 100 are represented in FIG. 1 by numeral 41. Upon reading all four registers R0–R3, programmed control 16 resets registers R0–R3 for any ensuing calibration.

For generating calibration parameter data, programmed controller 16 calculates and stores, for each calibration sector, an average mark duration and an average gap duration based upon later described calibration signal patterns. Equations 1–6 below set forth the programmed control 16 calculations:

The average mark duration <mark> is calculated as:

$$<\text{mark}> = \frac{1}{N_m} \sum_{i=1}^{N_m} L_i^m = \frac{R_0}{R_2} \quad \text{Equation 1}$$

In Equation 1, L indicates the "ith" measured mark "m" duration, N is the number of marks read from the sector while $R_0/R_1$ indicates that the content of register R0 is divided by the content of register R1.

The average gap duration is calculated as:

$$<\text{gap}> = \frac{1}{N_g} \sum_{i=1}^{N_g} L_i^g = \frac{R_1}{R_3} \quad \text{Equation 2}$$

In Equation 2, L indicates the "ith" measured gap "g" duration, N is the number of gaps read from the sector while $R_1/R_3$ indicates that the content of register R1 is divided by the content of register R3.

The variables $R_0$ through $R_3$, the contents of registers 80–83, respectively, are calculated as set forth below in equations 3 through 6. The other constants for each calibration pattern are defined in equations 3 through 6.

$$\sum_{i=1}^{N_m} L_i^m = R_0 \quad \text{Equation 3}$$

In equation 3, $N_m$ is the number of marks, L is the "ith" measured mark m duration with the summation being stored in register R0 as value $R_0$.

Register R1 81 contains the sum of all the gap durations in the calibration pattern. That sum is calculated as set forth in equation 4:

$$\sum_{i=1}^{N_g} L_i^g \to R_1 \quad \text{Equation 4}$$

In equation 4, $N_g$ is the number of measured gap g durations in the calibration pattern and "L" is the "ith" duration in the sector.

Equation 5 shows that register R2 82 contains the number of measured mark durations $N_m$, represented by value $R_2$.

$$N_m \rightarrow R_2 \qquad \text{Equation 5}$$

Register R3 83 contains the number of measured gap durations $N_g$, as represented in equation 6.

$$N_g \rightarrow R_3 \qquad \text{Equation 6}$$

Equations 7 and 8 below illustrate the programmed control 16 least squares calculations for obtaining optimum laser power level. Equation 7 shows finding a value delta $\Delta$ (usually non-zero since there is only one optimum laser power for each laser power level) that represents the difference or delta between an average mark duration and an average gap duration. Equation 7 is executed for each calibration sector. A least squares analysis of the Equation 7 sector results identifies an optimum laser power. Such analysis may require an interpolation between two sector delta values to obtain a true optimum laser power. Equation 8 sets forth calculating an average clock period for each sector based on measured gap and mark durations, i.e., derived from the read calibration patterns.

$$\Delta \equiv \frac{C_1 \langle \text{mark} \rangle - C_2 \langle \text{gap} \rangle}{C_3 T_c} \equiv 0 \text{ at calibration} \qquad \text{Equation 7}$$

A clock period $T_c$ is calculated at shown in Equation 8 that is based upon the read calibration pattern from the sector. Constants $C_1$, $C_2$ and $C_3$ are respectively defined in Equations 9–11.

$$T_c \equiv \frac{C_4 \langle \text{mark} \rangle + C_5 \langle \text{gap} \rangle}{C_6} \qquad \text{Equation 8}$$

In Equation 8, constants $C_4$, $C_5$, and $C_6$ are defined in Equations 12–14 below.

Equations 9, 10 and 11 defining constants $C_1$ through $C_3$ are based on design choices of desired average mark and gap durations "$\langle \text{mark} \rangle_{desired}$ and $\langle \text{gap} \rangle_{desired}$. Constants $C_1$ and $C_2$ are the quotients of the desired mark and gap durations divided by the result of equation 7 value $T_C$ as calculated for each calibration sector.

$$C_1 \equiv \frac{\langle \text{gap} \rangle_{desired}}{T_c} \qquad \text{Equation 9}$$

$$C_2 \equiv \frac{\langle \text{mark} \rangle_{desired}}{T_c} \qquad \text{Equation 10}$$

$$C_3 \equiv C_1 \times C_2 \qquad \text{Equation 11}$$

The equations 12–14 below are all design data defining a calibration pattern as recorded in each of the calibration sectors.

$C_4$=Number of marks in each calibration pattern  Equation 12

$C_5$=Number of gaps in each calibration pattern  Equation 13

$C_6$=Number of clocks in each calibration pattern  Equation 14

The number of clocks (clock periods) indicates the number of clock periods used to record a complete calibration pattern in each calibration sector. Each calibration sector measured clock period is defined by Equation 8. Clock periods indicated by numeral 114 as they relate to marks and gaps are best seen in FIG. 3.

Table I below gives an example of applying the above equations for calibrating a laser write beam to a plurality of write power levels to be used in writing blocks of recording code patterns. It is to be understood that the laser pulse sequences are repeated a plurality of times in each recording in a plurality of sectors store separate copies of the calibration pattern. Each of the sectors receiving a calibration pattern is termed a calibration sector. Each calibration sector stores a calibration pattern consisting of a plurality of the below-listed laser pulse sequences for the respective laser power levels P4, P2 and P3. The recording power level is varied from calibration sector to calibration sector for having a plurality of laser power levels from which to find an optimum laser power level for each laser power level P4, P2 and P3.

TABLE I

| LASER POWER | CALIBRATION PATTERN | LASER PULSE SEQUENCE | CONSTANTS | | | | | |
|---|---|---|---|---|---|---|---|---|
| | | | $C_1$ | $C_2$ | $C_3$ | $C_4$ | $C_5$ | $C_6$ |
| $P_4$ | 5G, 4M, 5G, 2M | 11111414T111114T | 5 | 3 | 15 | 2 | 2 | 16 |
| $P_2$ | 5G, 4M, 5G, 3M | 11111414T1111142T | 5 | 3.5 | 17.5 | 2 | 2 | 17 |
| $P_3$ | 5G, 4M, 5G, 8M | 11111414T111114131314T | 5 | 6 | 30 | 2 | 2 | 22 |

In the TABLE I column "CALIBRATION PATTERN", G indicates a gap pulse, M indicates a mark pulse and T indicates laser off for one pulse. In calibration pattern for $P_4$, 5 G indicates five clock periods, hence five pulses to indicate a gap while 4M indicates four clock periods to indicate a mark. In the column "LASER PULSE SEQUENCE, numerals 1, 2, 3 and 4 respectively indicate laser drive power levels $P_1$ $P_2$ $P_3$ and $P_4$ and T indicate that no later-described laser writing pulse is emitted. Power level $P_1$ is a pre-heat power level that provides the pre-heating described by Hurst, Jr. in said Ser. No. 08/342,196, i.e., creates a gap 45 (FIG. 3). The constants $C_1$ through $C_6$ are those values calculated using equations 9 through 14 above. Power level P1 is not calibrated. The calibration pattern and the laser pulse sequence are identical respectively for the three power calibrateable power levels for creating a mark as described by Hurst, Jr., supra.

Referring next to FIG. 3, a PWM signal includes a series of alternating marks 43 and gaps 45 disposed in successive constant duration data cells indicated by numeral 110. In an unbanded optical disk rotated at a constant angular velocity, the physical lengths of data cells 110 vary with the optical disk radius. In a so-called radially-banded optical disk rotated at a constant angular velocity, the variation of physical lengths of data can be minimized to be negligible. In optical disks rotated at a constant lineal velocity (as for video and audio disks), the data lengths are constant. The leading edge of each data cell is a leading mark transition 112A, also termed P herein. A trailing edge transition 113, also termed N herein, identifies a transition between each mark 43 and gap 45 within a data cell 110. Each mark 43 duration indicates plural-bit data while each gap 45 fills out a data cell. As explained in Belser et al, a pulsed laser beam creates each mark 43 as a series of overlapping laser pulses represented in FIG. 3 by hash marks 114. The three calibrated write levels P2, P3 and P4. Laser power level P1, used for creating gaps 45 by not recording any signal on the optical disk, is not calibrated. Marks 43 are created by a specific series of overlapped pulses, each pulse having one of power levels P2, P3 or P4 in a sequence for making transitions defining marks 43 to be more reliably machine sensible. The Table I illustrated calibration patterns are an example of such pulse power level modulation for mark generation. Data cells 110 are shown as having constant durations, no limitation thereto intended.

Figure 5:
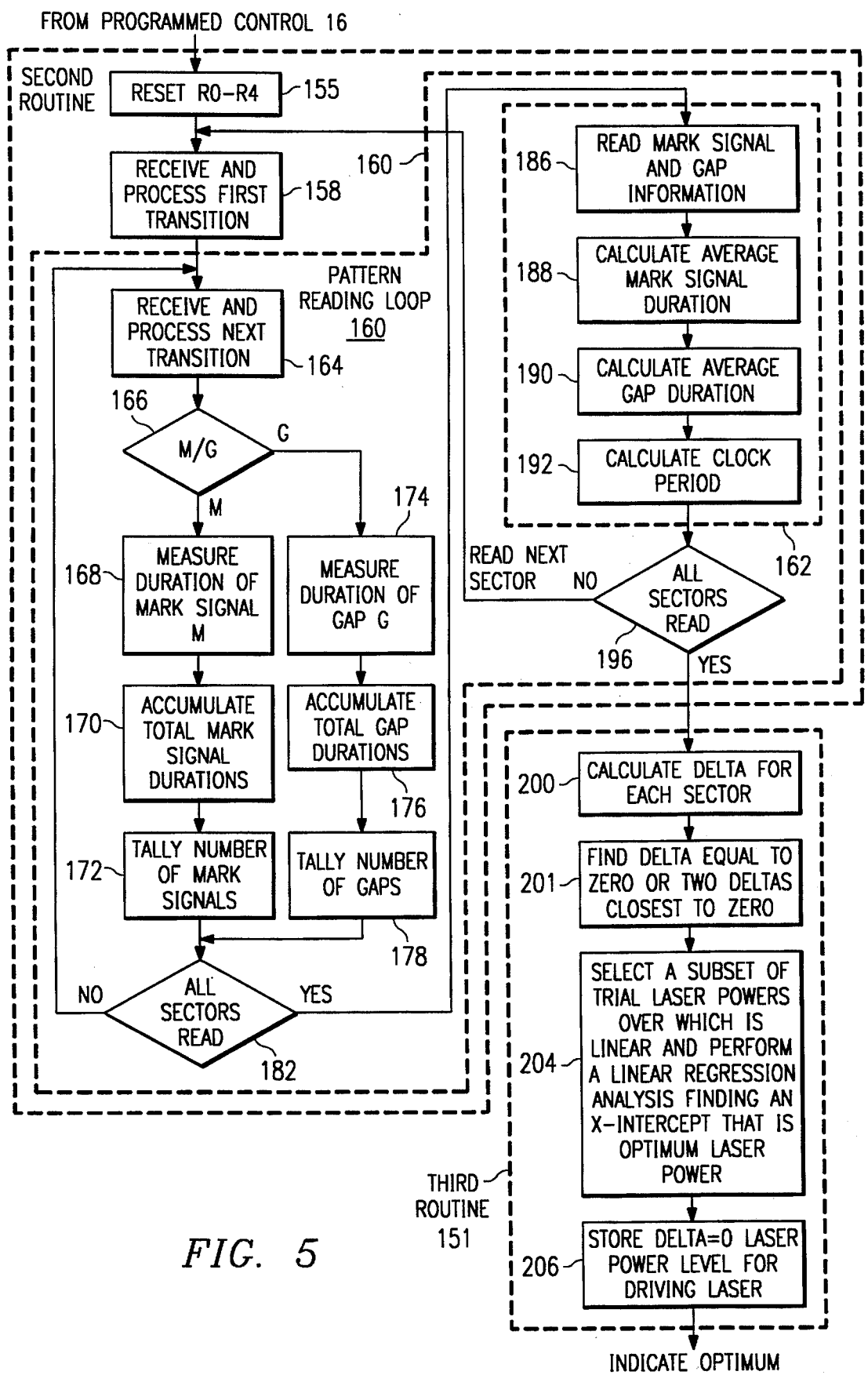

FIG. 4 is a flow chart showing the inventive calibration routines 120–122. The three routines 120–122 respectively calibrate power levels P4, P2 and P3, in that sequence. Each of the routines 120–122 have three subroutines. Subroutine 1 records a respective Table I defined calibration pattern in a plurality of optical disk sectors, herein termed calibration sectors. Each calibration sector receives a calibration pattern at respective diverse laser powers of the power level being calibrated. Other power levels in the illustrated calibration patterns are at a constant power in all sectors. This subroutine uses parameter data identified in Equations 9 through 14 that define calibration pattern design constants $C_1$ through $C_6$. Such values are design choices, preferably empirically determined, for implementing the present invention. A first routine 120 calibrates a highest power level P4. Routines 121 and 122 use the calibrated power level P4 while calibrating lower power levels P2 and P3 using calibration patterns shown in Table I. Then second subroutine 2 reads the recorded calibration patterns, sector by sector. The read patterns of the diverse sectors are separately analyzed as set forth above with respect to FIG. 2 to produce calibration data. The calibration data are stored such that data from each sector can be separately analyzed. The second subroutine prepares some parameter data for use in a third subroutine. Finally, third subroutine 3 analyzes the data, sector by sector, for finding an optimum laser power level of the power level being calibrated. Equation 7, supra, defines the desired optimum laser power. The Equation 7 results of each sector are compared for finding parameters in Equation 7 results of each sector are compared for finding parameters in Equation 7 that results in a zero (0) delta ($\Delta$) value—an optimum laser recording power. Later-described FIG. 5 illustrates a sequence of machine steps that are used in the illustrative embodiment for illustrating routines 120–122.

In routine 120, first subroutine 125 records the Table I indicated calibration pattern for laser power P4, the high laser power level used in the illustrative embodiment. The calibration pattern recording power level for P4 power is linearly varied from sector to sector in a plurality of optical disk sectors. Each sector is recorded at a respective constant laser power for P4. All other power levels are at a constant laser power for all sectors. Second subroutine 127 reads the recorded P4 calibration patterns, sector by sector. The read back values for each sector are separately stored in programmed control 16 in a usual random access memory (not shown). Third subroutine 129 analyzes the data stored in programmed control 16 to find the optimum laser power for laser power level P4.

Calibrating routines 121 and 122 are identical excepting that routine 121 calibrates laser power level P2 (second laser power level to be calibrated) while routine 122 calibrates laser power level P3 (third laser power level to be calibrated). Calibrated write power level P4 is used in routines 121 and 122 for calibrating power levels P3 and P2. First subroutine 131 in routine 121 records the P2 calibration pattern of Table I. Subroutine 133 reads the recorded P2 calibration pattern. The calibration data generated from the P2 calibration pattern read from each sector is stored in programmed control 16. Subroutine 135, identical to subroutine 129, analyzes the stored calibration data for finding optimum laser power level for P2.

Routine 122 calibrates laser power P3 in subroutines 137–139. Subroutines 137–139 are identical to steps 131, 133 and 135, respectively, excepting that power level P3 is calibrated.

FIG. 5 illustrates reading and analyzing recorded Table I illustrated calibration data. FIG. 5 assumes that the calibration patterns have been recorded in first subroutines 125, 131 and 137 using the Hurst, Jr., supra, recording technique. The FIG. 5 illustrated first and second subroutines 150 and 151 respectively illustrate details of second subroutines 127, 133 and 138 and third subroutines 129, 135 and 139. The flow chart illustrated process uses circuits illustrated in FIG. 2 and programming represented by the flow charts of FIGS. 4 and 5 in program storage 18 (FIG. 1).

First subroutine 150 begins in step 155 with programmed control 16 resetting, via line 84, registers 80–83. Then pattern reading loop 160 reads all sectors recorded for calibrating one laser power level. Step 162 in pattern reading loop 160 solves some of the equations defining the illustrated embodiment for preparing parameter data for third subroutine 151. In pattern reading loop 160, step 158, executed in edge detector 48 (FIG. 2), receives and detects a first recorded mark leading transition 112A recorded in a sector being read. In Table I the leftmost P4 power level (indicated in Table I by numeral 4) represents an onset of the first leading transition in the respective calibration patterns. Step 164 receives and detects each successive signal transition in the calibration sector being read. Repetitions of step 164 are executed in edge detector 48. Step 166, executed in mark-gap calculator 62, determines whether the processed transition indicates a trailing transition or edge of a mark 43 (M) or gap 45 (G). As seen in FIG. 3, a positive going transition represents a trailing end of a gap 45 while a negative going transition represents a trailing end of a mark 43. Responding to a detected end of a mark, step 168, executed in mark-gap calculator 62, measures the duration or width of a mark 43. Step 170, solving Equation 3, accumulates the measured mark durations into register R0 80. Step 172 solves Equation 5 to tally the number of detected marks in register R2 82. Similarly for gaps 45 (G in step 166) steps 174, 176 and 178 respectively perform the above-described machine operations set forth in steps 168, 170 and 172 solving Equations 4 and 6. From steps 172 and 178, "sector read ?" decision step 182 determines whether reading the current calibration sector has completed. If the current calibration sector has not been completely read (no), then steps 164–178 are repeated until the current calibration sector has been completely read. When the current calibration sector has been completely read (yes), then steps 162 calculate parameter data for the current calibration sector. The laser beam continues to scan the spiral track toward a next calibration sector to be read (if any).

Step 186 reads the data from the four registers R0–R3 80–83 through serializer 98 to programmed control 16. Program control 16 then executes steps 190–192 for solving sector related ones of the equations set forth above. Step 190 solves equation 1 to calculate average mark duration in the sector. Step 190 solves equation 2 to calculate average gap duration in the sector. Step 192 solves Equation 8 for determining parameter clock period $T_C$ that is measured from the data based upon the average mark and gap durations <mark> and <gap>. Once step 192 solves Equation 8, then equations 9–11 are solved. It is pointed out that steps 162 for "intermediate" laser powers P2 or P3, steps 162 may be multi tasked with preparing a next calibration, as by recording a calibration pattern for another write power level.

"All sectors read" decision step 196, executed in programmed control 16, checks to see whether or not all of the calibration sectors have been read. If not (no), steps 158–192 are repeated while scanning successive ones of the calibration sectors. If time to reach the next calibration sector permits, step 162 can be performed before a next calibration sector is scanned. If "all sectors read" decision step 196 finds that all of the sectors have been read (yes), then third subroutine 151 is executed. At this time, all of the parameter data for all of the calibration sectors used to calibrate one laser power level are stored in programmed control 16.

Step 200 in third subroutine 151 solves Equation 7 to develop a delta value for each sector, hence each laser power level used for the power level being calibrated. In routines 121 and 122, the previously calibrated power level is held constant in all the routine 121 and 122 calibration sectors. Generally all of the delta values for each of the calibration sectors are non-zero, i.e., Equation 7 indicates that the read calibration sector indicates that the laser power used to write (record) a calibration pattern in that sector is not the desired optimum laser power level. Remember that the optimum laser power for the power being calibrated is indicated by the Equation 7 delta value being zero. Step 201 examines the stored delta values. Step 201, based on the examination selects a subset of values corresponding to a particular subset of test laser powers. The selected subset of values will be used in a linear regression analysis to determine the optimum laser power; i.e. that power where Equation (7) is satisfied and &Delta ($\Delta$)=0. The selected subset should be chosen over a range wherein $\Delta$ depends linearly on laser power. As the dependence of $\Delta$ on laser power is usually very linear over a wide range of powers this choice is not very critical. The range can be verified by noting the correlation coefficient of the linear regression. The center point of the selected subset is found in step 204 by finding any zero value of $\Delta$ or two values that are closest to zero, one positive value and one negative value. Subsequently, a linear regression is performed on the selected subset of values for calculating an x-intercept. This x-intercept represents the laser power where $\Delta$ is zero and is chosen as the optimum (calibrated) laser power. Then step 206 indicates the x-intercept is selected as the optimum power for the power level being calibrated.

Upon completion of the FIG. 4 illustrated flow chart, optimum laser powers have been identified for writing power levels P4, P2 and P3. These values are stored within a retentive memory (not shown) in programmed control 16 for later use in writing to a laser disk used in the calibration processing. Each optical disk results in a separate set of optimum laser write power levels.

Since calibration of the intermediate laser power levels P3 and P2 use calibrated laser power level P4, a constant ratio exists between the three calibrated laser power levels. Such constant ratio enables later calibration of one of the laser power levels and extrapolating the calibration to the other laser power levels without re-calibrating all of the laser power levels.

While the invention has been particularly shown and described with reference to a preferred embodiment thereof, it will be understood by those skilled in the art that various changes in form and details may be made therein without departing from the spirit and scope of the invention.

What is claimed is:

1. A method for calibrating a laser for emitting any one of a first number of laser power levels, a first one of said laser power levels being a minimum laser power level for indicating a gap, a second number less than said first number of recording ones of said laser power levels for recording data on a record member, hereafter recording power levels, for recording mark signals on said record member;

comprising steps of:

generating a first calibration pulse pattern including said first one power level and predetermined ones of said recording power levels for recording said calibration pulse pattern as a plurality of said mark signals and gaps;

repeatedly recording timed pulses for generating said calibration pulse pattern on an optical disk at respective diverse second power level amplitudes;

reading said recorded calibration pattern;

deriving a clock time period indication from said read calibration pattern;

analyzing said read calibration pattern for finding an optimum second laser power level as a predetermined one of said recording power levels, said analyzing including;

finding and indicating average gap and mark durations for all of said calibration patterns recorded at said diverse amplitudes, respectively;

establishing desired gap and mark lengths respectively represented by first and second numbers of said clock time period; and executing a least squares analysis for finding an optimum laser amplitude for said predetermined one of said recording power levels indicated by a product of said desired gap length and said average mark length being equal to a product of said desired mark length and said averaged gap length.

2. The method set forth in claim 1, including a step of:

selecting said calibration patterns to represent a d,k code encoded recording;

first calibrating a first one of said recording power levels using said first one calibration pattern, making said first one of said recording power levels a maximum recording power level; and second calibrating a second one of said recording power levels using a second calibration pattern, inserting said maximum recording power level and a second one of said recording power levels into said second calibration pattern.

3. The method set forth in claim 1, including a step of:

selecting said calibration patterns to represent predetermined pulse-width modulated signals, respectively.

4. The method set forth in claim 1, including a step of:

selecting said second number to be greater than one.

5. The method set forth in claim 1, including steps of:

selecting said second number to be greater than two; and selecting said recording power levels to have fixed ratio power level differences.

6. The method set forth in claim 1, including steps of:

in said reading step:

counting a number of said clock time period indications in said calibration pattern for generating a number clock periods;

summing all durations of said marks, counting a number of said marks in said calibration pattern;

summing all durations of said gaps and counting a number of said gaps in said calibration pattern; and in said finding and indicating step;
dividing said summed durations of said marks and gaps by said counted number of said marks and gaps, respectively, for generating average mark and gap lengths; and in said executing step least squares analysis:
first for generating a time period $T_c$ dividing the sum of the products of said number of said marks in said calibration pattern time times said average mark duration plus said number of gaps times said average gap duration, then dividing said sum by said number of clock periods;

second for finding said optimum power level repeatedly solving the equation for a delta for each of said diverse second power levels, comprising:
subtracting a product of said desired gap length divided by said $T_c$ times said desired mark length from a product of said desired mark length divided by said $T_c$ times said desired gap length to generate a numerator value;

dividing said numerator value by a product of said desired mark length times said gap length times said $T_c$ to generate said delta for each of said diverse recording power levels; and third for finding said optimum power level examining said deltas for said diverse power levels for finding a zero delta value, determining a laser power level for said zero delta value and selecting said determined laser power level as said optimum power level.

7. The method set forth in claim 6, including steps of:
in said reading step:
converting said mark durations and said gap durations to mark and gap digital values, respectively;
in said establishing step, establishing mark and gap reference digital values;
comparing said mark and gap digital values with said mark and gap reference values, respectively, for indicating said marks and gaps, respectively;
for each of said indicated marks and gaps, summing a number of said digital values exceeding said mark and gap reference values, respectively, for generating said mark and gap durations, respectively; and
in said finding and indicating step, for each of said diverse power levels, digitally summing said generated mark and gap durations.

8. The method set forth in claim 1, including steps of:
in a first generating step performing said repeatedly recording step, said reading step, said analyzing step, said establishing step and said executing step for generating a first optimum power level for calibrating a first predetermined one of said recording power levels for generating and indicating a first optimum power level; and in a second generating step generating a second calibration pattern for calibrating a second predetermined one of said recording power levels, including in said second calibration pattern said first optimum power level and diverse second power levels of said second predetermined one of said recording power levels; and then repeating said repeatedly recording step recording said second calibration pattern, said reading step, said analyzing step, said establishing step and said executing step for generating a second optimum power level.

9. The method set forth in claim 8, including steps of:
first making said first calibration pattern a plurality of substantially contiguous repetitions of a first calibration sequence comprising power levels 11111414T111114T wherein "1" indicates a gap recording level, 4 indicates said first predetermined one of said recording levels and T indicates zero laser power emission; and second making said second calibration pattern a plurality of substantially contiguous repetitions of a second calibration sequence selected from a group of second calibration sequences, said group comprising sequence A of 11111414T1111142T and sequence B of 11111414T111114131314T wherein numeral 3 indicates said second recording power level wherein numeral 4 indicates said first optimum power level and numerals 2 and 3 respectively indicate said second recording power level in said sequences A and B.

10. The method set forth in claim 9, including steps of:
after said second generating step, performing a third generating step including selecting one of said calibration sequences A and B for a third predetermined one of said recording power levels, then repeating said second generating step for calibrating said third predetermined one of said recording power levels.

11. An optical disk recording device calibrated using the calibration steps set forth in claim 1.
selecting said first one of said laser powers that by itself does not record data on said record member;
selecting said record member to be an optical disk that is to receive and record said data as pulse-width modulated data-indicating signals.

12. An optical recording device having a laser recording portion calibrated as set forth in claim 11 and including a plurality of data-recording laser power levels at least one of said recording power levels being calibrated using a previously calibration laser power level in a calibration pattern used in calibrating said at least one recording power level.

13. Apparatus for calibrating a laser power system that is to supply laser recording power levels to a record member for recording data thereon, including in combination;
first generating means for generating a first calibration pulse pattern including said first one power level and predetermined ones of said recording power levels for recording said calibration pulse pattern as a plurality of said mark signals and gaps;
recording means for repeatedly recording timed pulses for generating said calibration pulse pattern on an optical disk at respective diverse second power level amplitudes;
reading means for reading said recorded calibration pattern;
timing means for deriving a clock time period indication from said read calibration pattern;
analyzing means connected to said reading means for receiving said read calibration pattern for analyzing said read calibration pattern for finding an optimum second laser power level, said analyzing means including;
finding means for finding and indicating average gap and mark durations for all of said calibration patterns recorded at said diverse amplitudes, respectively;
reference means for establishing desired gap and mark lengths respectively represented by first and second numbers of said clock time period; and
power determining means for executing a least squares analysis for finding an optimum laser amplitude for a predetermined one of said recording power levels indicated by a product of the ratio of said desired gap length to said average mark length being equal to a product of said desired mark length to said averaged gap length.

14. Apparatus set forth in claim 13, including in combination:

calibration sequence means in said first generating means for generating said calibration patterns in a d,k code encoded recording format said first generating means having first means for first calibrating a first one of said recording power levels using said first one calibration pattern, said first means making said first one of said recording power levels a maximum recording power level; and said first generating means having second means for second calibrating a second one of said recording power levels using a second calibration pattern, said second means inserting said maximum recording power level and a second one of said recording power levels into said second calibration pattern.

15. Apparatus set forth in claim 13, including in combination:

said first generating means generating said calibration patterns to represent a pulse-width modulated signal.

16. Apparatus set forth in claim 13, including in combination:

said first generating means generating said calibration patterns for calibrating said second number of said recording power levels that is greater than one.

17. Apparatus set forth in claim 13 including in combination:

said second number being greater than two; and said recording means recording of said laser power levels with a fixed ratio power level difference between said recording power levels.

18. Apparatus set forth in claim 13, including in combination:

said reading means including:
counting means for counting a number of said clock time period indications in said calibration pattern for generating a number clock periods;
mark summing means for summing all durations of said marks, counting a number of said marks in said calibration pattern;
gap summing all durations of said gaps and counting a number of said gaps in said calibration pattern;

said finding means including;
first division means for dividing said summed durations of said marks and gaps by said counted number of said marks and gaps, respectively, for generating average mark and gap durations; and said power determining means including;
period means for generating a time period $T_C$ dividing a sum of the products of said number of said marks in said calibration pattern time times said average mark duration plus said number of gaps times said average gap duration, then dividing said sum by said number of clock periods;
optimum means for finding an optimum power level including repeatedly solving the equation for a delta for each of said diverse second power levels, comprising:

subtraction means for subtracting a product of said desired gap length divided by said $T_C$ times said desired mark length from a product of said desired mark length divided by said $T_C$ times said desired gap length to generate a numerator value;
second division means for dividing said numerator value by a product of said desired mark length times said gap length times said $T_C$ to generate said delta for each of said diverse recording power levels; and
interpolation means for finding said optimum power level examining said deltas for said diverse power levels for finding a zero delta value, determining a laser power level for said zero delta value and selecting said determined laser power level as said optimum power level.

19. Apparatus set forth in claim 18, including in combination;

said reading means including;
analog-to-digital converting means for converting said mark durations and said gap durations to mark and gap digital values, respectively;
said reference means establishing said mark and gap lengths as multi-bit reference digital values;
comparing means for comparing said mark and gap digital values with said mark and gap reference digital values, respectively, for indicating said marks and gaps, respectively;
summing means summing for each of said indicated marks and gaps a number of said digital values exceeding said mark and gap reference values, respectively, for generating said mark and gap durations, respectively; and said finding means finding and indicating for each of said diverse power levels digitally summing said generated mark and gap durations.

20. Apparatus set forth in claim 13, including in combination:

sequence means having first means for first activating in sequence said first generating means, said recording means, said reading means, said timing means, said analyzing means, said finding means, said reference means and said power determining means for calibrating a first predetermined one of said recording power levels for generating and indicating a first optimum power level for a first one of said laser recording power levels; and said sequence means having second means for second activating said first generating means, said recording means, said reading means, said timing means, said analyzing means, said finding means, said reference means and said power determining means for calibrating a second predetermined one of said recording power levels, including in said second calibration pattern said first optimum power level and diverse second power levels of said second predetermined one of said recording power levels, for generating and indicating a second optimum power level for a second one of said recording power levels.

21. Apparatus set forth in claim 20, including in combination:

said sequence means having first means for actuating said first generating means for making said first calibration pattern a plurality of substantially contiguous repetitions of a first calibration sequence comprising power levels 11111414T111114T wherein "1" indicates a gap recording level, 4 indicates said first predetermined one of said recording levels and T indicates zero laser power emission; and said sequence means having second means for actuating said first generating means to make said second calibration pattern to consist of a plurality of substantially contiguous repetitions of a second calibration sequence selected from a first sequence in a group of second calibration sequences, said group comprising sequence A of 11111414T1111142T and sequence B of 11111414T111114131314T wherein numeral 3 indicates said second recording power level wherein numeral 4 indicates said first optimum power level and numerals 2 and 3 respectively indicate said second recording power level in said sequences A and B.

22. Apparatus set forth in claim 21, including in combination:

said sequence means having third means for actuating said first generating means for generating a third calibration pattern including selecting a second one of said second calibration sequences A and B for a third predetermined one of said recording power levels.

\* \* \* \* \*